US009240969B1

(12) United States Patent
Jordan et al.

(10) Patent No.: US 9,240,969 B1
(45) Date of Patent: Jan. 19, 2016

(54) ENCOURAGING CONVERSATION IN A SOCIAL NETWORK

(71) Applicant: Google Inc., Mountain View, CA (US)

(72) Inventors: Timothy Emmet Jordan, Alameda, CA (US); Natalie Villalobos, Alameda, CA (US)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 13/794,570

(22) Filed: Mar. 11, 2013

(51) Int. Cl.
 *G06F 15/16* (2006.01)
 *H04L 12/58* (2006.01)

(52) U.S. Cl.
 CPC ............. *H04L 51/32* (2013.01); *H04L 12/588* (2013.01)

(58) Field of Classification Search
 CPC ............................. H04L 12/588; H04L 51/32
 USPC .................................................. 709/204–207
 See application file for complete search history.

(56) References Cited

U.S. PATENT DOCUMENTS

| | | | |
|---|---|---|---|
| 2003/0233408 A1* | 12/2003 | Goodman | 709/206 |
| 2009/0030774 A1* | 1/2009 | Rothschild et al. | 705/10 |
| 2009/0055481 A1* | 2/2009 | Carmel et al. | 709/206 |
| 2009/0177754 A1* | 7/2009 | Brezina et al. | 709/206 |
| 2011/0196863 A1* | 8/2011 | Marcucci et al. | 707/728 |
| 2013/0018968 A1* | 1/2013 | Pennacchiotti et al. | 709/206 |
| 2014/0289258 A1* | 9/2014 | Joshi et al. | 707/741 |

* cited by examiner

*Primary Examiner* — Brendan Higa
(74) *Attorney, Agent, or Firm* — Patent Law Works LLP (57) ABSTRACT

The disclosure includes a system and method for recommending social activity data and social conversation to a user. The system includes a processor and a memory storing instructions that, when executed, cause the system to: determine one or more topics associated with a message based at least in part on message data included in the message; determine knowledge data describing the one or more topics associated with the message; determine social activity data describing one or more user activities associated with a group of one or more social users based at least in part on the knowledge data, the one or more user activities describe the one or more topics; and determine graphical user interface data for displaying the social activity data associated with the message.

20 Claims, 7 Drawing Sheets

ENCOURAGING CONVERSATION IN A SOCIAL NETWORK

BACKGROUND

The present disclosure relates to social networks.

Many users share links or start a conversation through emails. However, email is not an optimal mechanism for sharing links or for engaging in a conversation. Social networks are changing the way users communicate with one another by providing a better mechanism for users to easily share information and engage in a conversation with other users.

SUMMARY

According to one innovative aspect of the subject matter described in this disclosure, a system for recommending social activity data and social conversation is described. The system includes a processor and a memory storing instructions that, when executed, cause the system to: determine one or more topics associated with a message based at least in part on message data included in the message; determine knowledge data describing the one or more topics associated with the message; determine social activity data describing one or more user activities associated with a group of one or more social users based at least in part on the knowledge data, the one or more user activities describe the one or more topics; and determine graphical user interface data for displaying the social activity data associated with the message.

In general, another innovative aspect of the subject matter described in this disclosure may be embodied in methods that include determining one or more topics associated with a message based at least in part on message data included in the message; determining knowledge data describing the one or more topics associated with the message; determining social activity data describing one or more user activities associated with a group of one or more social users based at least in part on the knowledge data, the one or more user activities describing the one or more topics; and generating graphical user interface data for displaying the social activity data associated with the message.

Other aspects include corresponding methods, systems, apparatuses, and computer program products for these and other innovative aspects.

These and other implementations may each optionally include one or more of the following operations. For instance, the operations further include: ranking the social activity data based at least in part on one or more popularities associated with the social activity data; identifying a first user associated with the message, determining whether the group of one or more social users is associated with the first user and ranking the social activity data based at least in part on whether the group of one or more social users is associated with the first user; ranking the social activity data based at least in part on the one or more topics; identifying a first user associated with the message and a group of one or more second users associated with the first user and generating the graphical user interface data for providing an access to the group of one or more second users; and generating one or more tags based at least in part on the one or more topics associated with the message and generating the graphical user interface data for displaying the one or more tags. For instance, the features include that the social activity data includes a post provided by a social network service.

The present disclosure may be particularly advantageous in a number of respects. First, the system can provide an easy way for a user to start a social conversation through email. For example, the system can provides accesses to a social conversation in a social network service upon a user receiving or sending an email. Second, the system can beneficially determine one or more second users associated with a first user who receives or sends an email. The system then can advantageously provide access for the first user to start a social conversation with the one or more second users through a social network service. Third, the system can provide social activity data upon a user receiving or sending an email. The social activity data describes one or more topics associated with the email so that the user can continue engaging with the existing topics through social networks.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
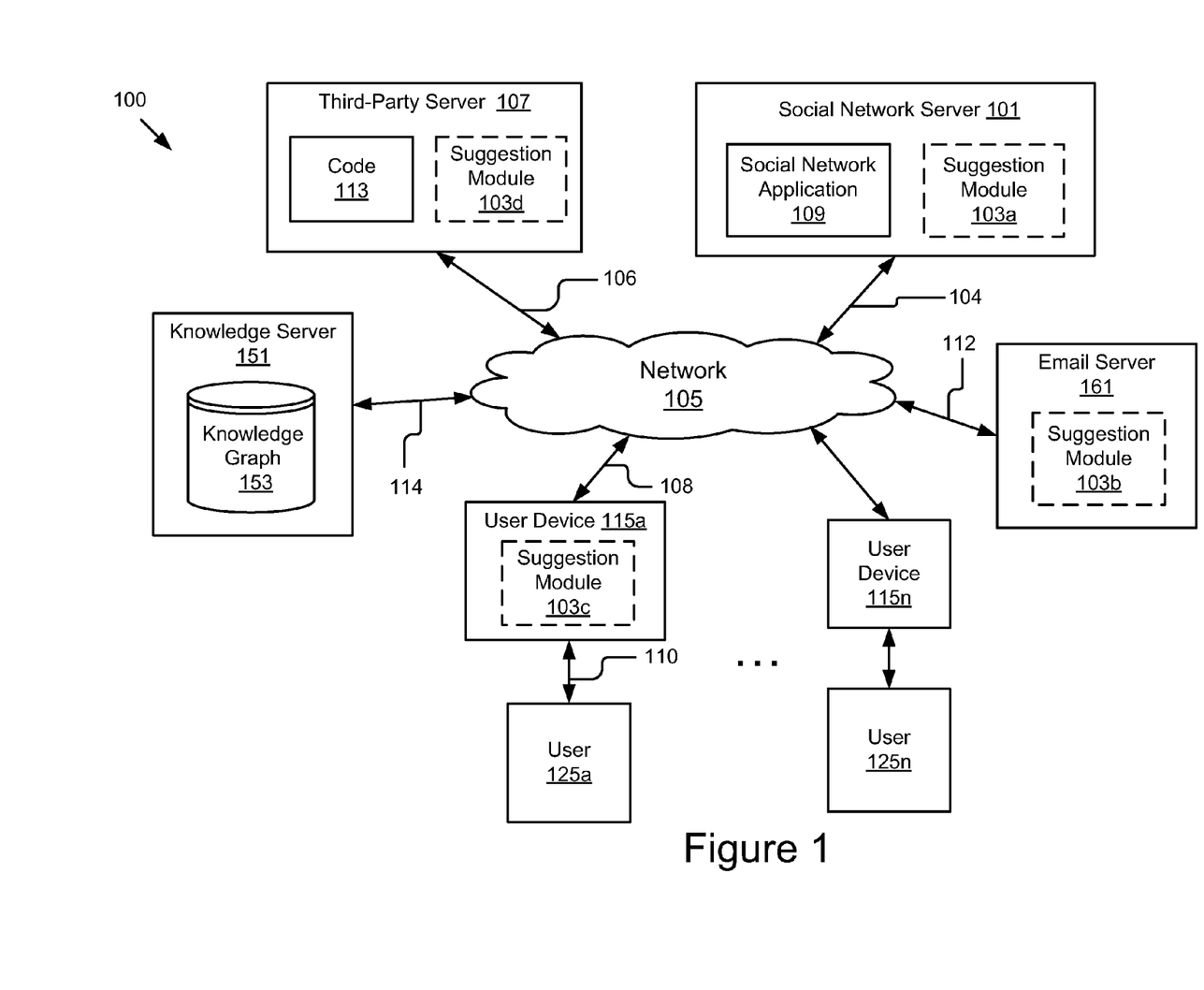
FIG. 1 is a block diagram illustrating an example system for recommending social activity data and social conversation to users.

FIG. 1 illustrates a block diagram of some implementations of a system 100 for recommending social activity data and social conversation to users 125a-125n. The illustrated system 100 for recommending social activity data and social conversation to users 125a-125n includes a social network server 101, a network 105, a third-party server 107, a knowledge server 151, an email server 161 and one or more user devices 115a-115n (also referred to herein individually and collectively as 115) that are accessed by users 125a-125n (also referred to herein individually and collectively as 125). In the illustrated implementation, these entities are communicatively coupled via the network 105. While the present disclosure is described below primarily in the context of recommending social activity data and social conversation to users 125, the present disclosure is applicable to improving user experience with other aspects of a social network.

The user devices 115a, 115n in FIG. 1 are used by way of example. While FIG. 1 illustrates only two user devices 115, it should be understood that numerous different user devices 115 are available to numerous different users 125. Furthermore, while only one network 105 is coupled to the social network server 101, the third-party server 107 and the user devices 115a, 115n, in practice multiple networks 105 can be connected to these entities. Furthermore, while only one third-party server 107 is shown, the system 100 could include one or more third-party servers 107. While only one knowledge server 151 and one email server 161 are shown, the system 100 could include one or more knowledge servers 151 and one or more email servers 161.

While shown as stand-alone server in FIG. 1, in other implementations all or part of the social network server 101 could be part of the third-party server 107 that is connected to the network 105 via signal line 106. The social network server 101 interacts via signal line 104 and the network 105 with the third-party server 107 and user devices 115a-115n. In some implementations, the social network server 101 cooperates with the user device 115 to generate and present user interfaces for showing user content streams. The social network server 101 is coupled for communication with the user device 115a, which is connected to the network 105 via signal line 108. The user 125a interacts with the user device 115a as represented by the signal line 110. Similarly, the user device 115n is coupled to the network 105 via a signal line and the user 125n interacts with the user device 115n as represented by a signal line. It should be understood that the social network server 101 can be stored in any combination of the devices and servers, or in only one of the devices or servers. The third-party server 107, the knowledge server 151 and the email server 161 are coupled to the network 105 by signal line 106, 114, 112, respectively for communication with the social network server 101 and the user devices 115.

In some implementations, the social network server 101, the third-party server 107, the knowledge server 151 and the email server 161 are hardware servers that include a processor, memory, and network communication capabilities.

The social network server 101 as depicted in FIG. 1 includes a social network application 109. Although only one social network server 101 is shown, it should be understood that multiple social network servers 101 may be present. A social network is any type of social structure where the users 125 are connected by a common feature. The common feature includes friendship, family, work, an interest, etc. The common features are provided by one or more social networking systems including explicitly-defined relationships and relationships implied by social connections with other online users, where the relationships form a social graph (not pictured). In some examples, the social graph can reflect a mapping of these users 125 and how they are related. Furthermore, it should be understood that social network server 101 and social network application 109 are representatives of one social network and that there can be multiple social networks coupled to the network 105, each having its own server, application and social graph. For example, a first social network is more directed to business networking, a second is more directed to or centered on academics, a third is more directed to local business, a fourth is directed to dating and others of a general interest or a specific focus. In some implementations, the social network includes a service that provides a social feed describing one or more activities of a user 125. For example, the social feed includes one or more status updates for the user 125 describing the user's actions, thoughts, opinions, etc. In some implementations, the social network application 109 is stored and executed on one of the third party server 107. In some implementations, the service provided by the social network application 109 is referred to as a "social network service." Other implementations are possible. For example, in some implementations, the services and components of the third party server 107 and the social network server 101 can be provided by the same one or more servers. Moreover, the separation of various components and servers in the implementations described herein should not be understood as requiring such separation in all implementations, and it should be understood that the described components and servers can generally be integrated together in a single component or server.

The social network server 101 also includes a suggestion module 103a (also referred to herein individually and collectively as 103). In some implementations, the suggestion module 103 can be stored on the email server 161. For example, the suggestion module 103b is stored on the email server 161, which is connected to the network 105 via signal line 112. In some implementations, the suggestion module 103 can be included in the user device 115. For example, the suggestion module 103c is stored in the user device 115a, which is connected to the network 105 via signal line 108. In some implementations, the suggestion module 103 can be stored on a third-party server 107, which is connected to the network 105 via signal line 106. It should be understood that the suggestion module 103 can be stored in any combination on the devices and servers.

The suggestion module 103 can be software including routines for recommending social activity data and social conversation to users. The operational functionality of the suggestion module 103 is described in more detail below with reference to FIGS. 2-5B.

In some implementations, a code 113 can be stored on the third-party server 107, which is communicatively coupled to the network 105 via signal line 106. The third-party server 107 includes an application and/or software for generating a third-party website (not shown). In some implementations, the code 113 can be code or routines configured to enable the application and/or software included in the third-party server 107 to communicate with the suggestion module 103 and/or the social network application 109 so that the application and/or software can use the services provided by the suggestion module 103 and/or the social network application 109. For example, the code 113 communicates with the social network application 109 to generate an option for acknowledgement indications and incorporate it within the third-party website for users visiting the third-party website to indicate an acknowledgement on at least one item present in the third-party website. In some implementations, the code 113 can be a snippet that includes HyperText Markup Language code ("HTML code") that can be configured to communicate with the suggestion module 103 and/or the social network application 109 to exchange data, information and/or commands. In some implementations, the code 113 includes code from a group of C, C++, Java, CSS and PHP. Furthermore, while only one code 113 is shown in the third-party server 107, the third-party server 107 could include one or more codes 113.

A knowledge graph 153 can be stored on the knowledge server 151, which is communicatively coupled to the network 105 via signal line 114. In some implementations, the knowledge graph 153 stores knowledge data describing one or more topics. The knowledge data can be structured and categorized based at least in part on topics. For example, assume two related topics are a "book of an author X" and the "author X". The knowledge graph 153 stores a first set of knowledge data describing the "book of the author X" and a second set of knowledge data describing the "author X." The knowledge graph 153 also stores a mapping of the first set of knowledge data and the second set of knowledge data and how they are related. For example, the knowledge graph 153 stores data describing the first set of knowledge data and the second set of knowledge data are related because they describe the related topics. It should be understood that the knowledge graph 153 can apply other methods to associate knowledge data.

The network 105 can be wired or wireless, and may have any number of configurations including a star configuration, token ring configuration or other configurations. Furthermore, the network 105 may include a local area network (LAN), a wide area network (WAN) (e.g., the Internet), and/or any other interconnected data path across which multiple devices may communicate. In yet another implementation, the network 105 may be a peer-to-peer network. The network 105 may also be coupled to or includes portions of a telecommunications network for sending data in a variety of different communication protocols. In yet another implementation, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 2:
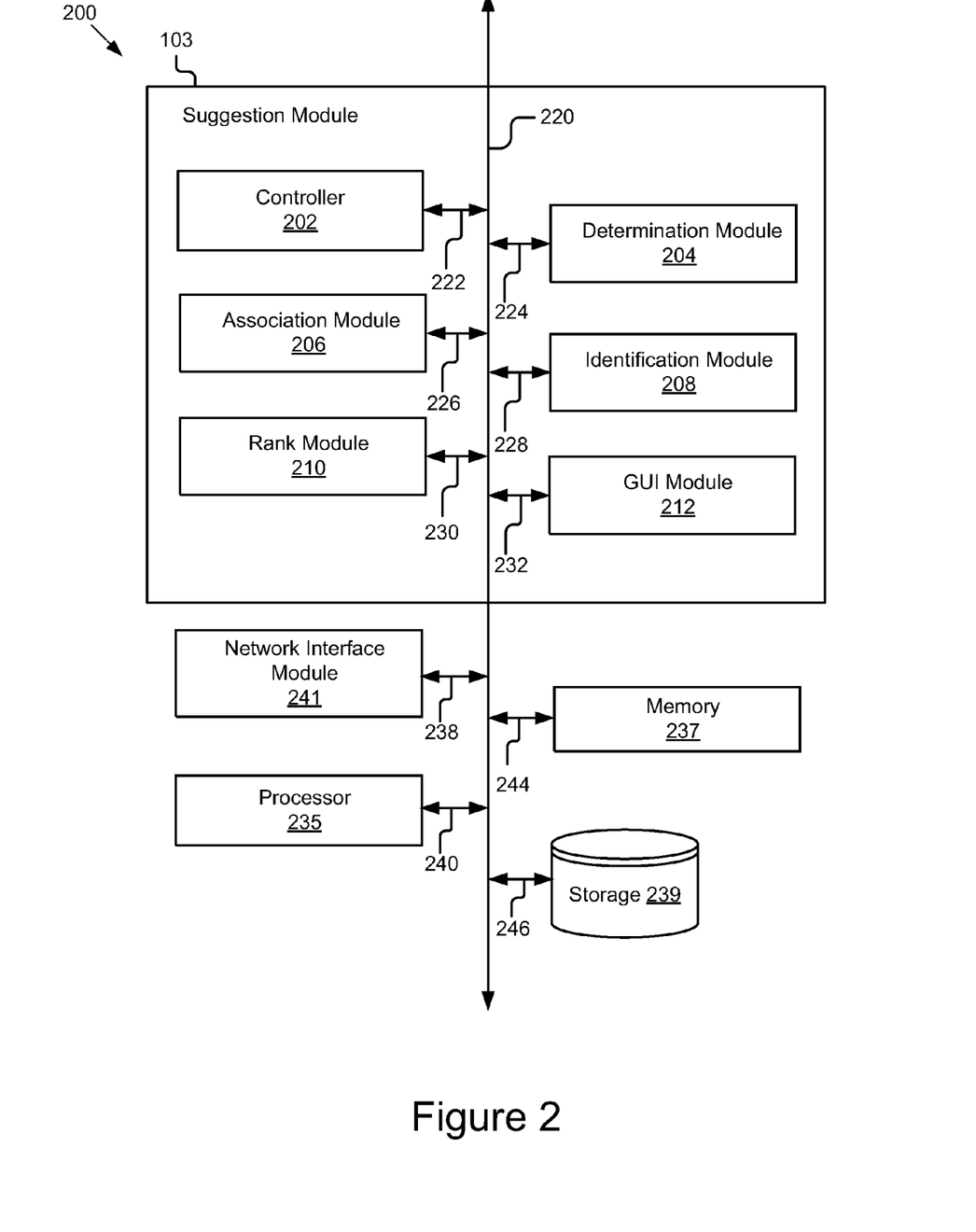
FIG. 2 is a block diagram illustrating an example of a suggestion module.

Referring now to FIG. 2, the suggestion module 103 is shown in more detail. FIG. 2 is a block diagram of some implementations of a computing device 200 that includes the suggestion module 103, a memory 237, a processor 235, storage 239 and a network interface module 241. Optionally, the computing device 200 can be a social network server 101. In some implementations, the computing device 200 can be an email server 161. In some implementations, the computing device 200 can be a user device 115. In some implementations, the computing device 200 can be a third-party server 107.

The network interface module 241 can be coupled to network 105 by a signal line (not shown) and also coupled to the bus 220 via signal line 238. The network interface module 241 includes ports for wired connectivity including USB, SD, or CAT-5, etc. The network interface module 241 links the processor 235 to the network 105 that may in turn be coupled to other processing systems. The network interface module 241 provides other connections to the network 105 using network protocols including TCP/IP, HTTP, HTTPS or SMTP. In other implementations, the network interface module 241 includes a transceiver for sending and receiving signals using Wi-Fi, Bluetooth® or cellular communications for wireless communication.

The processor 235 includes an arithmetic logic unit, a microprocessor, a general-purpose controller or some other processor array to perform computations and provide electronic display signals to a display device. The processor 235 can be coupled to the bus 220 via signal line 240 for communication with the other components. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. Other processors, operating systems, sensors, displays and physical configurations are possible.

The memory 237 stores instructions and/or data that may be executed by processor 235. The memory 237 can be coupled to the bus 220 via signal line 244 for communication with the other components. The instructions and/or data may include code for performing any and/or all of the techniques described herein. The memory 237 may be a dynamic random access memory (DRAM) device, a static random access memory (SRAM) device, flash memory or some other memory device.

In some implementations, the storage 239 stores data, information and instructions used by the suggestion module 103. Such stored information includes information about users, messages, posts, photos, and other information. The storage 239 may be a non-volatile memory or similar permanent storage device and media, for example, a hard disk drive, a floppy disk drive, a CD ROM device, a DVD ROM device, a DVD RAM device, a DVD RW device, a flash memory device, or some other mass storage device for storing information on a more permanent basis. The storage 239 can be coupled to the bus 220 via signal line 246 for communication with other components 202, 204, 206, 208, 210, 212, 235, 237 and 241 of the computing device 200.

In some instances, the data stored in the storage 239 can include message data, knowledge data, social activity data and user data. In some implementations, the storage 239 stores other data necessary for implementing the functionality of the suggestion module 103.

The message data can be data included in messages. In some implementations, message data includes data contained in an email message sent or received by a user 125. For example, the message data can include data describing message content, e.g., a message subject, a message body, etc. For example, the message body can include one or more of an article, a picture, a video, an audio and an embedded link to a web page, etc. The web page indicated by the embedded link can further include another article, picture, video, audio and link. In some implementations, the message data can also include data describing sending and receiving information. For example, the sending and receiving information includes a sender, a receiver, a receiving time, etc. In some implementations, the suggestion module 103 parses the message data to determine one or more topics for the message. This process will be described in more detail below.

The knowledge data can include data describing one or more topics associated with a message. In some implementations, the knowledge data for a message describes a first topic associated with a message. In some implementations, the knowledge data can also include one or more second topics related to the first topic of the message. For example, assume that a topic for an email message is determined as "2012 Summer Olympics." The knowledge data for this email message can include data describing the "2012 Summer Olympics," e.g., a location of the "2012 Summer Olympics," time schedules for the "2012 Summer Olympics," an opening ceremony for the "2012 Summer Olympics," etc. The knowledge data can also include data describing one or more second topics related to the "2012 Summer Olympics." For example, the knowledge data can include data describing previous Summer Olympics, well-known athletes at the "2012 Summer Olympics," open ceremonies for the previous Summer Olympics, Winter Olympics, etc. In some implementations, the suggestion module 103 determines the knowledge data based at least in part on one or more topics associated with a message and further determines social activity data based at least in part on the knowledge data. This process will be described in more detail below.

The social activity data can describe one or more user activities associated with a group of social users 125. The one or more user activities can be received through a social network service provided by the social network application 109. The social users 125 can be users 125 who have registered accounts with the social network application 109. For example, social activity data can include posts, comments, pictures, videos, audios, links, etc., submitted by a group of social users 125 to a social network service provided by the social network application 109. In some implementations, the social activity data can include one or more user activities describing one or more topics. Accordingly, in some implementations, the suggestion module 103 determines social activity data describing one or more topics associated with a message based at least in part on knowledge data. For example, assume that the knowledge data describes a first topic of a message, e.g., the "2012 Summer Olympics," and one or more second topics related to the first topic. The suggestion module 103 determines social activity data including one or more user activities that describe the first topic, e.g., the "2012 Summer Olympics," and/or one or more second topics related to the "2012 Summer Olympics." For example, the one or more user activities can include posts, comments, pictures, videos, audios and links submitted by a group of social users 125 that describe the first topic, e.g., the "2012 Summer Olympics" and/or one or more second topics related to the "2012 Summer Olympics."

The user data can include data describing one or more social users 125 that are associated with a first user 125 specified by a message. In some implementations, a first user 125 can be a receiver of a message. In some implementations, a first user 125 can be a sender of a message. Assume that the first user 125 has an account with the social network application 109. Therefore, the first user 125 is a social user 125. The first user 125 can be associated with one or more sets of other social users 125 (e.g., friend set, family set, acquaintance set, following set, etc.). For example, their relationships can be specified by the social graph maintained by the social network application 109. These friend set, family set, acquaintance set and following set of social users 125 associated with the first user 125 will be referred to hereinafter as relationship sets associated with the first user 125. In some implementations, the suggestion module 103 identifies a group of social users 125 associated with the first user 125 from the one or more relationship sets. For example, the group of social users 125 can be within the friend set for the first user 125. The user data describes the group of social users 125 associated with the first user 125.

Referring to FIG. 2, the suggestion module 103 is shown in greater detail. The suggestion module 103 includes a controller 202, a determination module 204, an association module 206, an identification module 208, a rank module 210 and a Graphical User Interface ("GUI") module 212. One function of the suggestion module 103 can be to recommend social activity data and user data to a user 125 based at least in part on a message. These components 202, 204, 206, 208, 210 and 212 are coupled to the bus 220 for communication with each other and the other components 241, 235, 237 and 239 of the computing device 200. The bus 220 can be any type of communication bus. The operation of these modules 202, 204, 206, 208, 210 and 212 will be described in more detail below with reference to FIGS. 3-5B.

The controller 202 can be software including routines for receiving data via the network interface module 241, routing data to an appropriate module and transmitting responses from modules to the network interface module 241 for transmission to other components in the system 100. In some implementations, the controller 202 can be a set of instructions executed by the processor 235 to provide functionality described below for handling communications between the suggestion module 103 and other components of the computing device 200. In some implementations, the controller 202 can be stored in the memory 237 of the computing device 200 and can be accessible and executable by the processor 235. The controller 202 may be adapted for cooperation and communication with the processor 235 and other components of the computing device 200 via signal line 222.

In some implementations, the controller 202 sends and receives data, via the network interface module 241, to and from the email server 161, the user device 115, the social network server 101 and the knowledge server 151. For example, the controller 202 receives, via the network interface module 241, a message (e.g., an email message) from the user device 115 or the email server 161. In some implementations, the controller 202 can receive an email message from the email server 161 upon the email message sent to a user 125. In some implementations, the controller 202 can receive an email message from the user device 115 upon a user 125 clicking on a "send" button on a user interface for sending the email message. In some implementations, the controller 202 sends the received message to the determination module 204 for parsing the message. In some implementations, the controller 202 corporates with the determination module 204 to retrieve knowledge data from the knowledge server 151. In some implementations, the controller 202 corporates with the identification module 208 to retrieve data stored in the social graph. In some implementations, the controller 202 receives GUI data from the GUI module 212 and sends the GUI data to the user device 115 for displaying social activity data and user data to a user 125 operating on the user device 115.

In some implementations, the controller 202 receives data from other components of the suggestion module 103 and stores the data in the storage 239. For example, the controller 202 receives knowledge data from the determination module 204 and stores the knowledge data in the storage 239. In some implementations, the controller 202 retrieves data from the storage 239 and sends the data to other components of the suggestion module 103. For example, the controller 202 retrieves social activity data and user data from the storage 239 and sends these data to the GUI module 212 for generating GUI data.

In some implementations, the controller 202 handles communications between components of the suggestion module 103. For example, the controller 202 receives data from one component of the suggestion module 103 and sends the data to another component of the suggestion module 103. For example, the controller 202 receives knowledge data from the determination module 204 and sends the knowledge data to the association module 206 for determining social activity data based at least in part on the knowledge data. For purposes of clarity and conciseness, the controller 202 may be omitted hereinafter when describing such a process. For example, the above process may be described as the following: the determination module 204 sends knowledge data to the association module 206 for determining social activity data based at least in part on the knowledge data.

The determination module 204 can be software including routines for determining knowledge data based at least in part on message data. In some implementations, the determination module 204 can be a set of instructions executable by the processor 235 to provide the functionality described below for determining knowledge data based at least in part on message data. In some implementations, the determination module 204 can be stored in the memory 237 of the computing device 200 and can be accessible and executable by the processor 235. The determination module 204 may be adapted for cooperation and communication with the processor 235 and other components of the computing device 200 via signal line 224.

In some implementations, the determination module 204 receives a message from the controller 202. For example, the message can be an email message including message data that describes sending and receiving information (e.g., a sender, a receiver, a receiving time, etc.) and message content (e.g., a message subject, a message body including an embedded link, etc.). In some implementations, the determination module 204 determines one or more topics associated with the message based at least in part on the message data. For example, the determination module 204 parses the message data included in the message and determines a topic. For example, assume an email message includes an embedded link to an article and the article describes the men's 100 meters final at the 2012 Olympics. The determination module 204 parses the email message data including the article indicated by the embedded link and determines a topic, e.g., the "2012 Olympics."

In some implementations, the determination module 204 determines knowledge data based at least in part on the one or more topics associated with the message. For example, the determination module 204 determines a first topic associated with a message. The determination module 204 retrieves, via the controller 202 and the network interface module 241, knowledge data describing the first topic and one or more second topics related to the first topic from the knowledge graph 153 on the knowledge server 151. Assume the message describes the first topic of a "new book of an author S". The determination module 204 retrieves knowledge data describing the "new book of the author S" from the knowledge graph 153. The determination module 204 also retrieves knowledge data describing second topics related to the "new book of the author S". For example, the determination module 204 retrieves knowledge data describing "the author S," "other books of the author S", "similar authors to the author S," "other books of similar type," etc.

In some implementations, the determination module 204 sends the knowledge data describing the one or more first and second topics to the association module 206. In some implementations, the determination module 204 stores the knowledge data describing the one or more first and second topics in the storage 239.

The association module 206 can be software including routines for determining social activity data based at least in part on the knowledge data. In some implementations, the association module 206 can be a set of instructions executable by the processor 235 to provide the functionality described below for determining social activity data based at least in part on the knowledge data. In some implementations, the association module 206 can be stored in the memory 237 of the computing device 200 and can be accessible and executable by the processor 235. The association module 206 may be adapted for cooperation and communication with the processor 235 and other components of the computing device 200 via signal line 226.

In some implementations, the association module 206 receives the knowledge data describing one or more topics from the determination module 204 and determines social activity data based at least in part on the knowledge data. As described above, in some implementations, the social activity data describes one or more user activities associated with a group of social users 125. The one or more user activities can be received by a social network service provided by the social network application 109. The social users 125 have accounts with the social network application 109. The social activity data can include posts, comments, pictures, videos, audios, links, etc., submitted by the social users 125 to the social network application 109 through the social network service. In some implementations, the association module 206 queries a social activity database (not pictured) to determine the social activity data that is associated with the knowledge data. The social activity database can store social activity data processed by the social network application 109. In some implementations, the association module 206 determines social activity data that describes the one or more topics specified by the knowledge data. For example, assume the knowledge data specifies the topics, e.g., the "new book of the author S," "the author S" and "similar authors to the author S." The association module 206 determines social activity data that describes these topics the "new book of the author S," "the author S" and "similar authors to the author S" by using the knowledge data to search in the social activity data database. The determined social activity data can include user activities describing these topics, e.g., posts describing the "new book of the author S," links to articles regarding the "new book of the author S," pictures for "the author S," videos about interviews of other "similar authors to the author S," etc.

In some implementations, the association module 206 determines one or more tags based at least in part on the one or more topics specified by the knowledge data. For example, assume knowledge data specifies a topic for a message as the "2012 Olympics". The association module 206 generates a tag, e.g., a "#Olympics" hash tag, based at least in part on the topic. In some implementations, the association module 206 determines one or more tags based at least in part on social activity data describing the one or more topics associated with the message. For example, the association module 206 determines social activity data including user activities, e.g., posts, pictures, videos, that describe an "author X." The association module 206 then determines a tag, e.g., a hash tag of "author X."

In some implementations, the association module 206 sends the social activity data to the rank module 210 for ranking the social activity data. In some implementations, the association module 206 stores the social activity data to the storage 239. In some implementations, the association module 206 sends the social activity data and tag data describing one or more tags to the GUI module 212 for generating GUI data.

The identification module 208 can be software including routines for identifying a first user 125 associated with the message and a set of second users 125 associated with the first user 125. In some implementations, the identification module 208 can be a set of instructions executable by the processor 235 to provide the functionality described below for identifying a first user 125 associated with the message and a set of second users 125 associated with the first user 125. In some implementations, the identification module 208 can be stored in the memory 237 of the computing device 200 and can be accessible and executable by the processor 235. The identification module 208 may be adapted for cooperation and communication with the processor 235 and other components of the computing device 200 via signal line 228.

In some implementations, the identification module 208 identifies a first user 125 based at least in part on message data included in a message. For example, the identification module 208 parses sending and/or receiving information included in an email message to identify a first user 125. In some implementations, the first user 125 can be a sender of the email message. In some implementations, the first user 125 can also be a receiver of the email message. In some implementations, the first user 125 is a social user 125 that has an account with the social network application 109.

In some implementations, the identification module 208 identifies a set of one or more second users 125 associated with the first user 125. For example, assume the first user 125 is a social user 125 who has an account with the social network application 109. As described above, the first user 125 can be associated with other social users 125 and their relationships can be specified by the social graph provided by the social network application 109. For example, the other social users 125 associated with the first user 125 can be friends, family, acquaintances or just followers of the first user 125. The social graph can store information for the other social users 125 in different relationship sets (e.g., friend set, family set, acquaintance set, following set, etc.). The identification module 208 determines a set of one or more second users 125 from the one or more of relationship sets of social users 125 associated with the first user 125. For example, the identification module 208 determines a set of one or more friends for the first user 125 based at least in part on the social graph.

In some implementations, the identification module 208 determines a set of one or more second users 125 associated with a first user 125 based at least in part on the message data. For example, the identification module 208 determines a first user 125 as a receiver of an email message sent by a second user 125. The second user 125 also sends copies of the email message to two third users 125. The identification module 208 queries the social graph and determines that the second user 125 and the two third users 125 are all "friends" for the first user 125. The identification module 208 then determines a set of "friends" for the first user 125. For example, the set of "friends" can include other social users 125 associated with the first user 125 by a friend relationship, as well as the second user 125 and the two third users 125. In other words, the identification module 208 identifies that all social users 125 involved in the email message are in one relationship set (e.g., the friend set) associated with the first user 125. Therefore, the identification module 208 determines a group of social users 125 in the same relationship set (e.g., the friend set).

In some implementations, the social users 125 involved in the message belong to multiple relationship sets associated with the first user 125. Assume that the identification module 208 determines a sender of a message as a first user 125 associated with the message. The identification module 208 determines that receivers of the message are either friends or families associated with the first user 125. In some implementations, the identification module 208 determines a relationship set from the multiple relationship sets based at least in part on current status of the involved social users 125. For example, if the families of the first user 125 involved in the message are online at the time, but not the first user's 125 friends, then the identification module 208 determines a set of families for the first user 125. In some implementations, the identification module 208 determines a relationship set from the multiple relationship sets by comparing the numbers of social users 125 in the multiple relationship sets. For example, if three social users 125 involved in the message are friends and only one social user 125 is a family member, then the identification module 208 determines a set of friends for the first user 125.

In some implementations, the identification module 208 sends user data describing one or more second users 125 in a relationship set associated with the first user 125 to rank module 210. In some implementations, the identification module 208 sends user data describing one or more second users 125 in a relationship set associated with the first user 125 to the GUI module 212 for generating GUI data. In some implementations, the identification module 208 stores user data describing one or more second users 125 in a relationship set associated with the first user 125 in the storage 239.

The rank module 210 can be software including routines for ranking the social activity data. In some implementations, the rank module 210 can be a set of instructions executed by the processor 235 to provide functionality described below for ranking the social activity data. In some implementations, the rank module 210 can be stored in the memory 237 of the computing device 200 and can be accessible and executable by the processor 235. The rank module 210 may be adapted for cooperation and communication with the processor 235 and other components of the computing device 200 via signal line 230.

In some implementations, the rank module 210 ranks the social activity data based at least in part on popularity associated with the social activity data. For example, the rank module 210 determines popularity for a piece of social activity data (e.g., a post) based at least in part on the number of visits to the piece of social activity data (e.g., the number of views for a post). The rank module 210 ranks the social activity data based at least in part on the popularity. For example, the rank module 210 ranks the social activity data higher if it has a higher popularity.

In some implementations, the rank module 210 ranks the social activity data based at least in part on relationships between one or more social users 125 associated with the social activity data and the first user 125 associated with the message. For example, the rank module 210 determines whether the one or more social users 125 are associated with the first user 125 and ranks the social activity data associated with the one or more social users 125 accordingly. For example, if the social activity data (e.g., a post) is submitted by a social user 125 who is associated with the first user 125 (e.g., the social user 125 is a friend of the first user 125), the rank module 210 ranks the social activity data higher and the social activity data will be displayed in front of other social activity data submitted by other social users 125 who are not associated with the first user 125 (e.g., social users 125 not in any relationship set associated with the first user 125 specified by the social graph).

In some implementations, the rank module 210 ranks the social activity data based at least in part on the one or more topics that it describes. For example, the rank module 210 classifies the social activity data based at least in part on the one or more topics that it describes and ranks the social activity data accordingly. For example, assume a first topic associated with a message is the "newest book written by an author". The social activity data includes user activities describing the first topic and one or more second related topics, e.g., the "newest book written by the author," "the author," "other books written by the author," "other books of a similar type," "other authors similar to the author," etc. The rank module 210 classifies the user activities into groups based at least in part on these topics and ranks the user activities by groups.

In some implementations, the rank module 210 sends the ranked social activity data to the GUI module 212 for generating GUI data. In some implementations, the rank module 210 stores the ranked social activity data in the storage 239.

The GUI module 212 can be software including routines for presenting or formatting information for presentation to users 125. For example, the GUI module 212 cooperates with a web browser (not pictured) on the user device 115 to generate the displays of the present disclosure. Examples of a user interface generated by the GUI module 212 will be described in more detail below with reference to FIGS. 5A-5B.

In some implementations, the GUI module 212 cooperates with the rank module 210 to display ranked social activity data to the first user 125 associated with the message. In some implementations, the GUI module 212 cooperates with the identification module 208 to provide accesses to the set of second users 125 to the first user 125 associated with the message. The GUI module 212 is coupled for communication with the processor 235 and other components of the computing device 200 via signal line 232.

One or more of the controller 202, the determination module 204, the association module 206, the identification module 208, the rank module 210, and the GUI module 212 are executable on the processor 235; store data that, when executed by the processor 235, causes the collectors/modules to perform the operations described herein; are instructions executable by the processor 235 to provide the functionality described herein; or are stored in the memory 237 of the social network server 101 and are accessible and executable by the processor 235.

Figure 3:
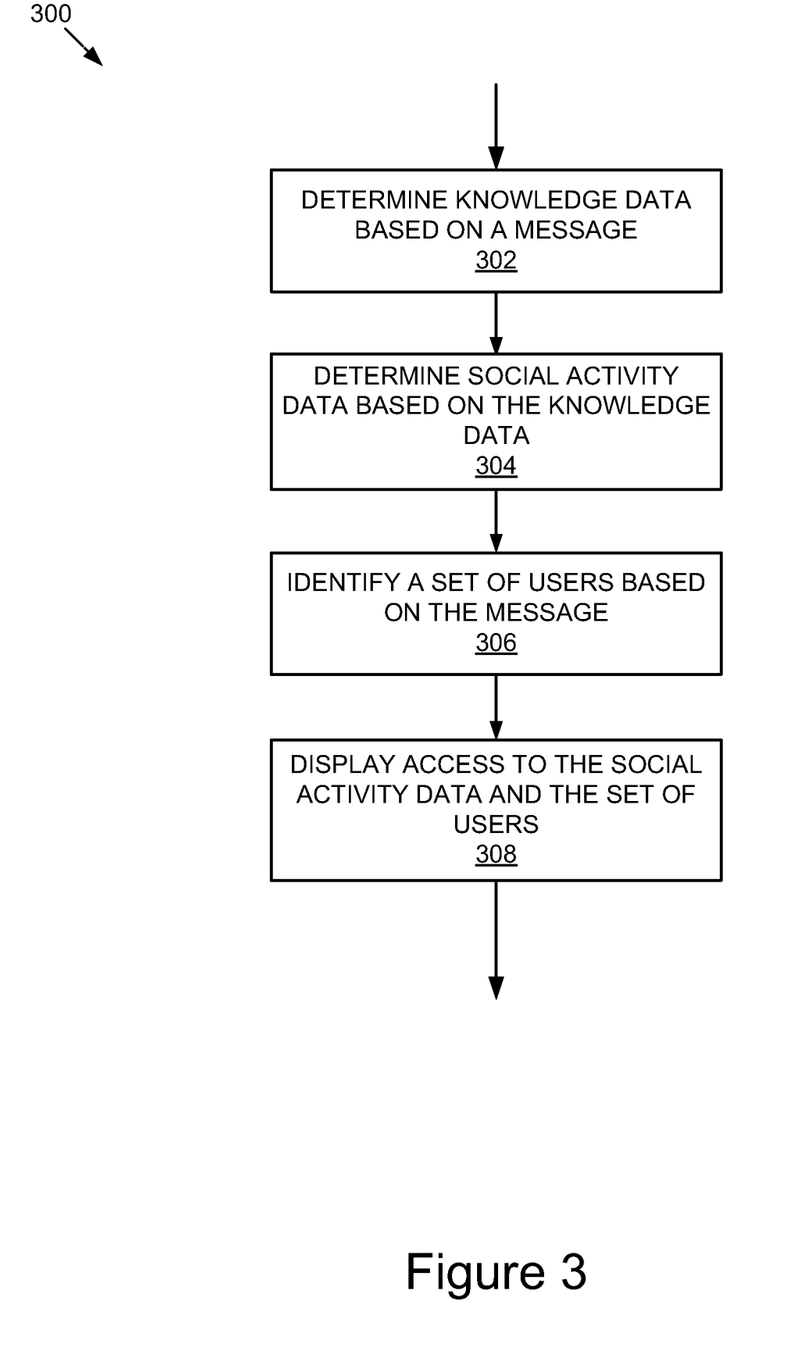
FIG. 3 is a flowchart of an example method for providing social activity data and social conversation access to a user.

Referring now to FIG. 3, an example of a method 300 for providing social activity data and social conversation access to a user 125 is described. The method 300 can include determining 302 knowledge data based at least in part on a message. For example, the determination module 204 receives a message including message data via the controller 202 and determines one or more first topics for the message. The determination module 204 determines knowledge data describing the one or more first topics and one or more second topics related to the one or more first topics. For example, the determination module 204 determines the knowledge data from the knowledge graph 153 based at least in part on the one or more first topics. The method 300 may continue by determining 304 social activity data based at least in part on the knowledge data. For example, the association module 206 queries a social activity database hosted by the social network application 109 to determine social activity data associated with the knowledge data. For example, the social activity data includes one or more user activities describing the one or more first topics and the one or more second topics related to the one or more first topics. The method 300 can also include identifying 306 a set of users 125 based at least in part on the message. For example, the identification module 208 identifies a first user 125 associated with the message (e.g., a receiver of the message) and determines a set of second users 125 associated with the first user 125 specified by the social graph, e.g., a friend set for the first user 125. The method 300 may continue by displaying 308 accesses to the social activity data and the set of second users to the first user 125. For example, the GUI module 212 generates GUI data for displaying the social activity data and accesses to the set of second users 125 which are clickable for the first user 125 to continue a social conversation with the set of second users 125.

In some implementations, while a first user 125 (e.g., a sender of a message) is drafting an email message that includes an embedded link or finishes drafting and clicks on a "send" button, the suggestion module 103 processes message data including the embedded link and determines a set of second users 125 associated with the first user 125 (e.g., a set of friends for the first user 125). The suggestion module 103 generates GUI data for displaying a user interface that suggests the first user 125 to share the embedded link publicly or with the set of second users 125 through a social network service provided by the social network application 109.

In some implementations, when a first user 125 (e.g., a receiver of a message) receives an email message from a friend, the suggestion module 103 determines social activity data based at least in part on message data included in the email message. For example, the social activity data includes posts submitted by social users 125 through a social network service that describe a topic of the email message. The suggestion module 103 provides the social activity data to the first user 125 by suggesting the first user 125 to explore the social activity data through the social network service.

In some implementations, when a first user 125 (e.g., a sender of a message) finishes drafting an email message and clicks on a "send" button, the suggestion module 103 generates GUI data for providing the first user 125 a populated user interface that includes social activity data and icons for a set of second users 125 associated with the first user 125 in addition to the email message content. Therefore, via the populated user interface, the suggestion module 103 provides the first user 125 an improved email message that includes not only richer message content but also accesses to social content in a social network service.

Figure 4A:
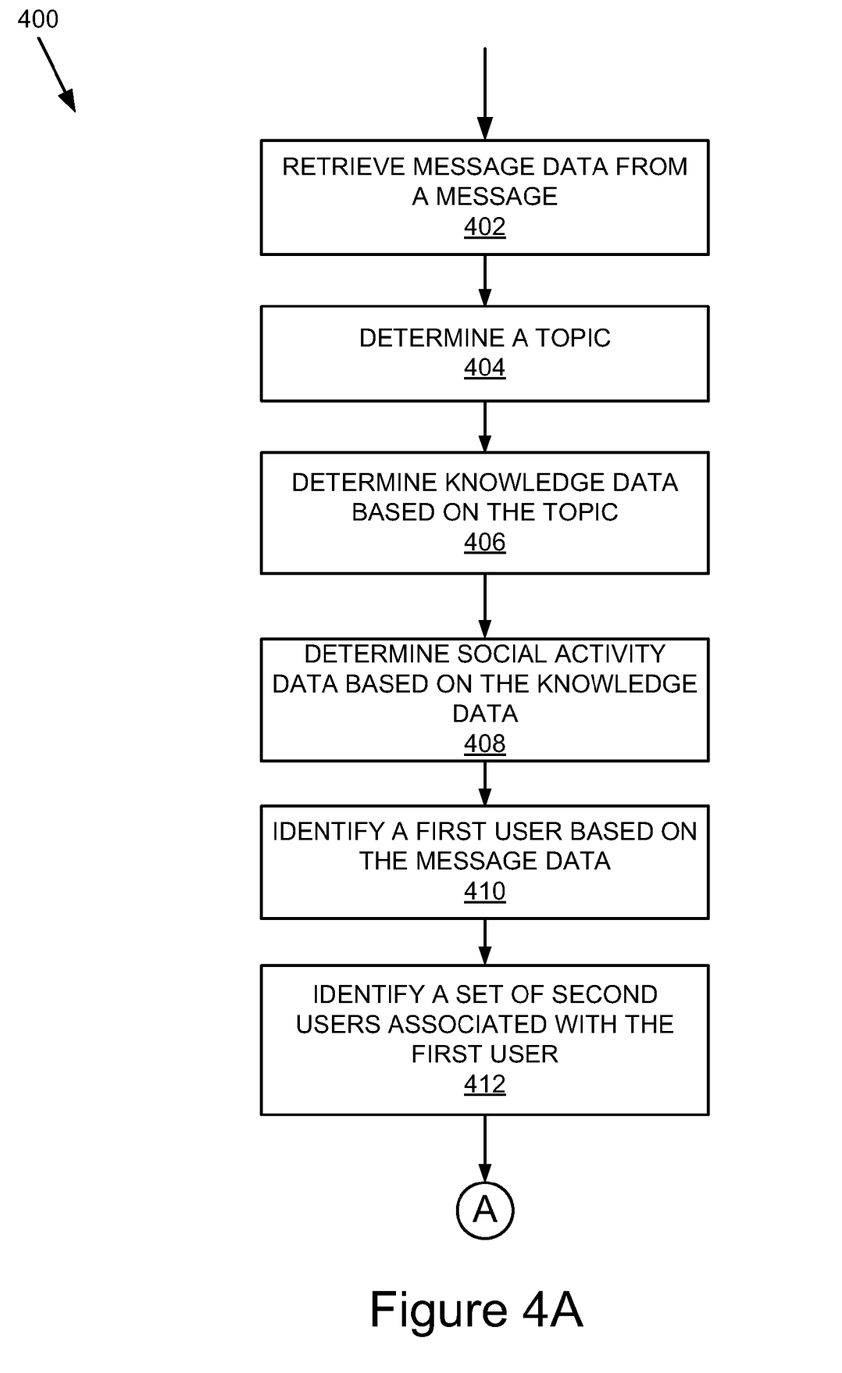
FIGS. 4A-4B are flowcharts of an example method for providing social activity data and social conversation access to a user.
Figure 4B:
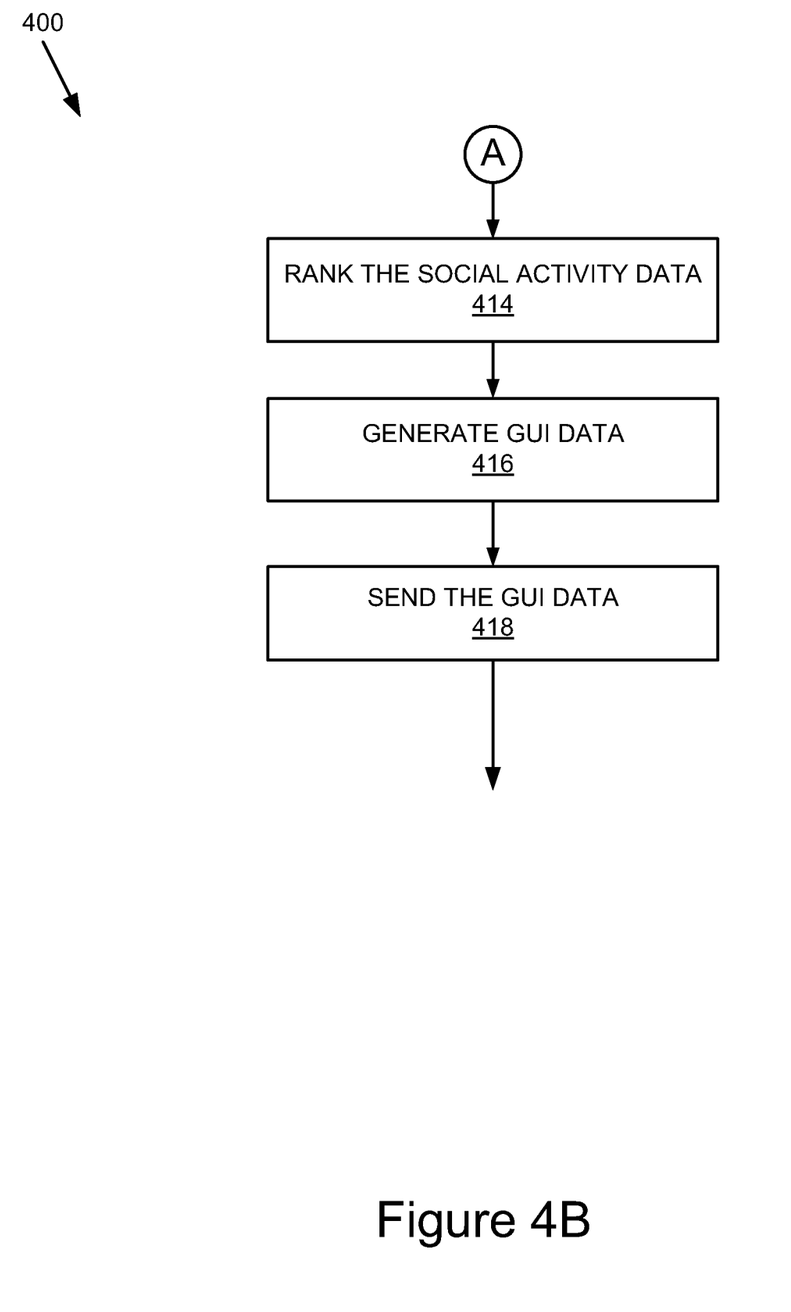

Referring now to FIGS. 4A-4B, an example method 400 for providing social activity data and social conversation access to a user 125 is described. Turning to FIG. 4A, the method 400 can include retrieving 402 message data from a message. For example, the determination module 204 receives a message and retrieves message data from the message. The message data includes sending and receiving information and message content. The method 400 may continue by determining 404 a topic associated with the message. For example, the determination module 204 parses the message data included in the message to determine a topic. The method 400 can include determining 406 knowledge data based at least in part on the topic. For example, the determination module 204 determines knowledge data describing the topic based at least in part on the knowledge graph 153. The method 400 may continue by determining 408 social activity data based at least in part on the knowledge data. For example, the association module 206 determines social activity data that describes the topic specified by the knowledge data. The method 400 can also include identifying 410 a first user 125 based at least in part on the message data. For example, the identification module 208 identifies a sender or a receiver based at least in part on the sending and receiving information included in the message. The method 400 may continue by identifying 412 a set of second users 125 associated with the first user 125. For example, the identification module 208 identifies a set of friends for the first user 125 that is specified by the social graph provided by the social network application 109.

Turning now to FIG. 4B, the method 400 may continue by ranking 414 the social activity data. In some implementations, the rank module 210 ranks the social activity data including user activities based at least in part on popularities of the user activities. In some implementations, the rank module 210 ranks the social activity data based at least in part on whether the social activity data has been submitted by a group of social users 125 associated with the first user 125. The method 400 can include generating 416 GUI data for providing accesses to the set of second users 125 and the ranked social activity data to the first user 125. The method 400 may continue by sending 418 the GUI data to the user device 115.

Figure 5A:
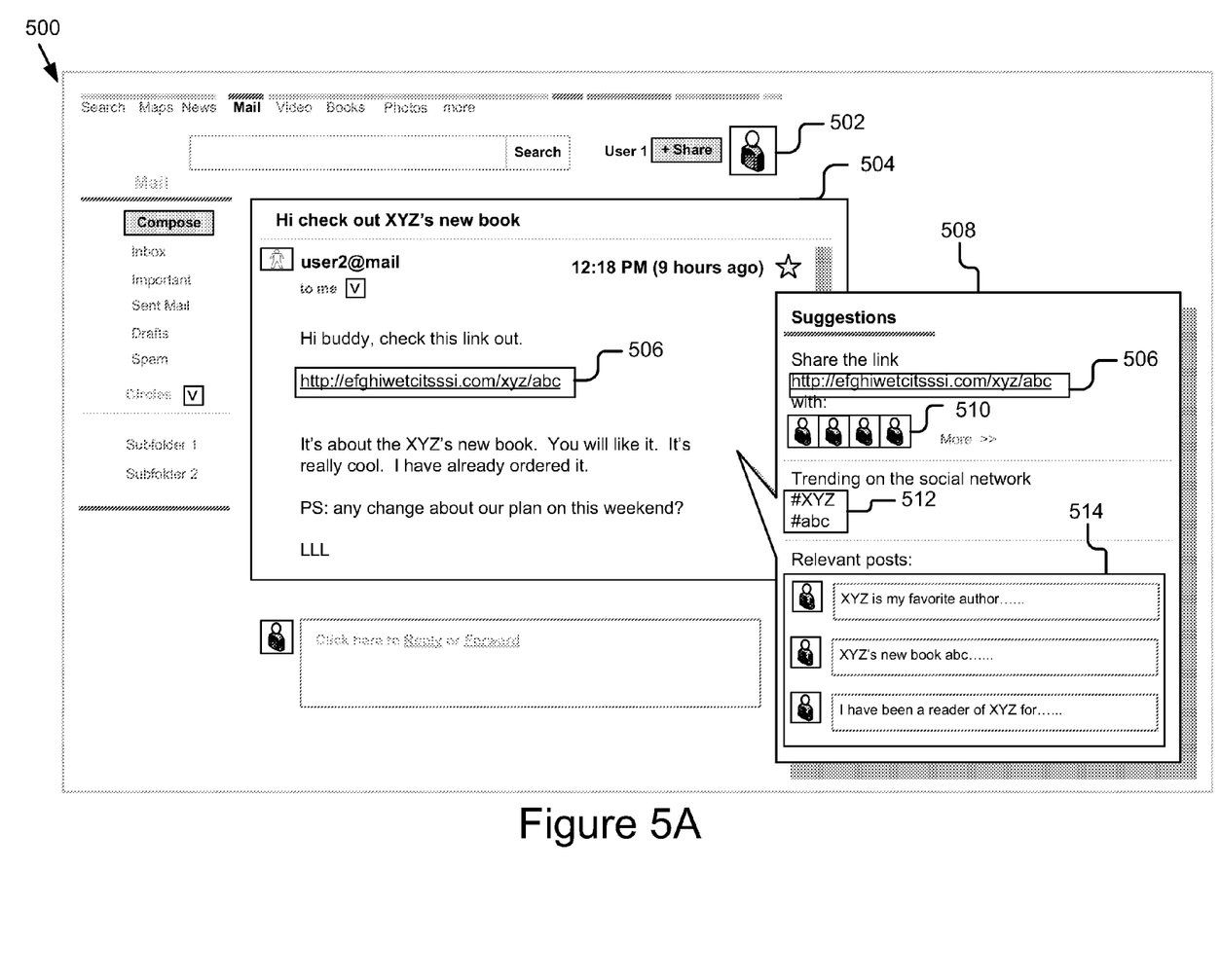
FIG. 5A is a graphic representation of an example user interface for displaying suggestions of accesses to social conversation and social activity data to the side of an email message.
Figure 5B:
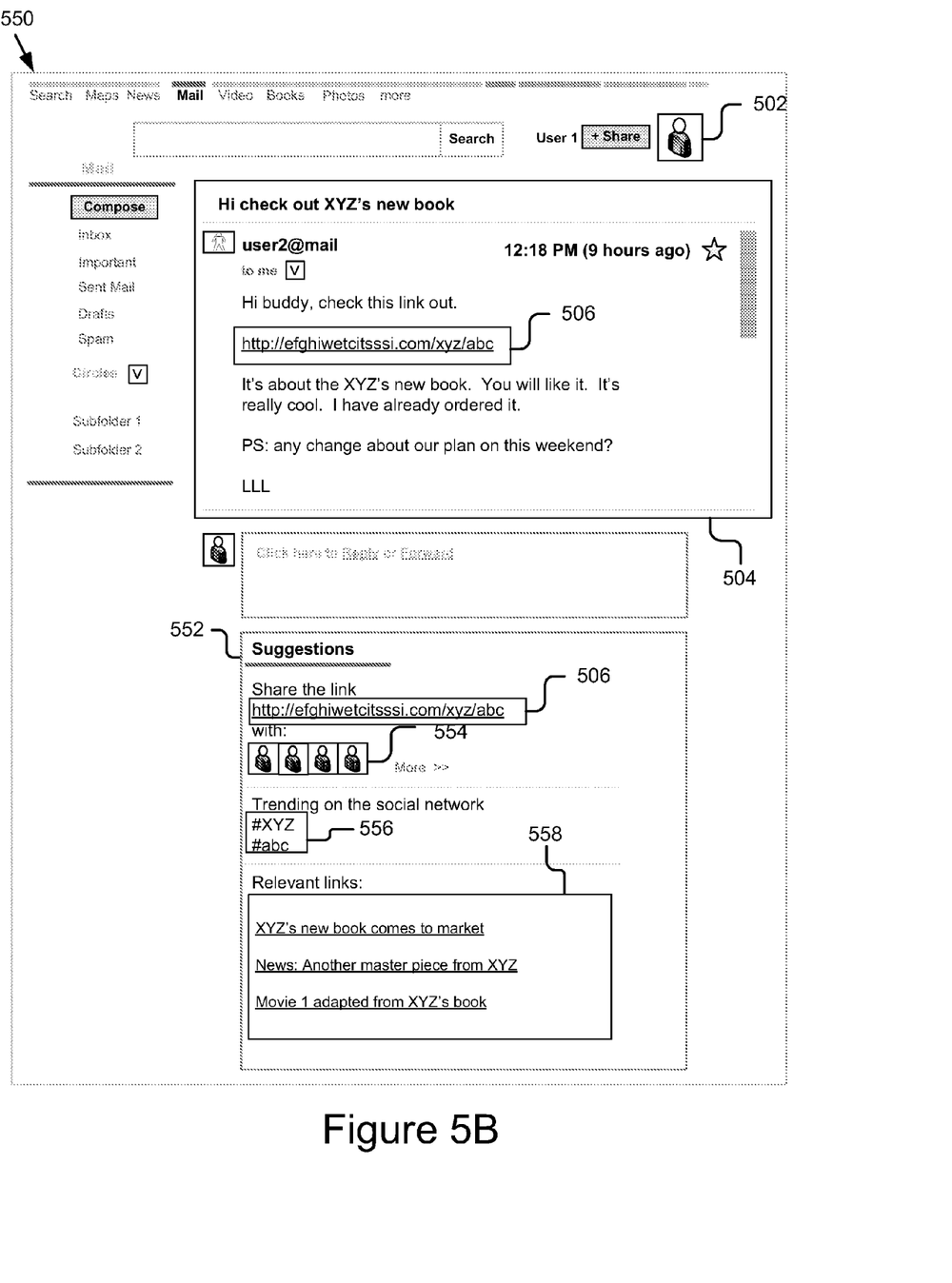
FIG. 5B is a graphic representation of an example user interface for displaying suggestions of accesses to social conversation and social activity data below an email message.

Referring now to FIGS. 5A-5B, graphic representations of example user interfaces generated by the GUI module 212 are depicted. FIG. 5A depicts a graphic representation of an example user interface 500 for displaying suggestions of accesses to social conversation and social activity data to the side of an email message. The user interface 500 includes a user icon 502, an email message 504 that includes a link 506 and a popup box 508. The user icon 502 displays a profile photo of a first user 125. The email message 504 can be an email message received by the first user 125. The email message 504 includes a link 506 which is clickable by the first user 125 to link to a new web page.

In some implementations, the popup box 508 provides suggestions to the first user 125 upon the first user 125 opening the email message 504. In some implementations, the popup box 508 can be displayed upon the first user 125 clicking through a call to action (not shown). In the illustrated implementation, the popup box 508 is to the side of the email message 504. The popup box 508 includes the link 506 and user icons 510 for a set of second users 125 which are clickable for the first user 125 to share the link 506 with the set of second users 125. In some implementations, the set of second users 125 is associated with the first user 125 and their relationships are specified by the social graph provided by the social network application 109. The popup box 508 can include hash tags 512 that describe one or more topics associated with the email message 504. The hash tags 512 can be clickable for the first user 125 to explore social activity data in the social network service that describes the one or more topics. The popup box 508 can also include relevant posts 514 that describe the one or more topics. In some implementations, the relevant posts 514 can be ranked based at least in part on their popularities.

FIG. 5B depicts a graphic representation of an example user interface 550 for displaying suggestions of accesses to social conversation and social activity data below an email message. Similar to the user interface 500 depicted in FIG. 5A, the user interface 550 also includes the user icon 502 for the first user 125, the email message 504 that includes the link 506. In the illustrated implementation, the user interface 550 includes a box 552. In some implementations, the box 552 provides suggestions to the first user 125 upon the first user 125 opening the email message 504. In some implementations, the box 552 can be displayed upon the first user 125 clicking through a call to action (not shown). In the illustrated implementation, the box 552 is below the email message 504. The box 552 includes the link 506 and user icons 554 for a set of second users 125 which are clickable for the first user 125 to share the link 506 with the set of second users 125. In some implementations, the set of second users 125 is associated with the first user 125 and their relationships are specified by the social graph provided by the social network application 109. The box 552 can also include hash tags 556 that describe one or more topics of the email message 504. The hash tags 556 can be clickable for the first user 125 to explore social activity data through the social network service that describes the one or more topics. The box 552 can also include relevant links 558 that link to social activity data describing the one or more topics. In some implementations, the relevant links to social activity data 558 can be ranked based at least in part on popularity for the social activity data.

Systems and methods for changing user profile impression in a social network have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in some implementations below with reference to user interfaces and particular hardware. Moreover, the technologies are disclosed above primarily in the context of a social network server; however, the disclosed technologies apply to other data sources and other data types (e.g., collections of other resources, images, audio, web pages, etc.).

Reference in the specification to "some implementations" or "an implementation" means that a particular feature, structure, or characteristic described in connection with the implementation is included in at least some implementations of the disclosed technologies. The appearances of the phrase "in some implementations" in various places in the specification are not necessarily all referring to the same implementation.

Some portions of the detailed descriptions above were presented in terms of processes and symbolic representations of operations on data bits within a computer memory. A process can generally be considered a self consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present disclosure can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method comprising:
   determining, by one or more processors, one or more topics associated with a message based at least in part on message data included in the message;
   determining, by the one or more processors, knowledge data describing the one or more topics associated with the message;
   determining, by the one or more processors, social activity data describing one or more user activities associated with a group of one or more social users based at least in part on the knowledge data, the one or more user activities describing the one or more topics;
   generating, by the one or more processors, a selectable tag based at least in part on the social activity data describing the one or more user activities, a selection of the selectable tag causing a display of the social activity data associated with the message; and
   generating, by the one or more processors, graphical user interface data for displaying the social activity data associated with the message in response to the selectable tag being selected.

2. The method of claim 1 further comprising ranking the social activity data based at least in part on one or more popularities associated with the social activity data.

3. The method of claim 1 further comprising:
   identifying a first user associated with the message;
   determining whether the group of one or more social users is associated with the first user; and
   ranking the social activity data based at least in part on whether the group of one or more social users is associated with the first user.

4. The method of claim 1 further comprising ranking the social activity data based at least in part on the one or more topics.

5. The method of claim 1 further comprising:
   identifying a first user associated with the message and a group of one or more second users associated with the first user; and
   generating the graphical user interface data for providing an access to the group of one or more second users.

6. The method of claim 1 further comprising:
   generating one or more tags based at least in part on the one or more topics associated with the message; and
   generating the graphical user interface data for displaying the one or more tags.

7. The method of claim 1, wherein the social activity data includes a post provided by a social network service.

8. A computer program product comprising a non-transitory computer usable medium including a computer readable program, wherein the computer readable program when executed on a computer causes the computer to:
   determine one or more topics associated with a message based at least in part on message data included in the message;
   determine knowledge data describing the one or more topics associated with the message;
   determine social activity data describing one or more user activities associated with a group of one or more social users based at least in part on the knowledge data, the one or more user activities describing the one or more topics;
   generate a selectable tag based at least in part on the social activity data describing the one or more user activities, a selection of the selectable tag causing a display of the social activity data associated with the message; and
   generate graphical user interface data for displaying the social activity data associated with the message in response to the selectable tag being selected.

9. The computer program product of claim 8, wherein the computer readable program when executed on the computer causes the computer to also rank the social activity data based at least in part on one or more popularities associated with the social activity data.

10. The computer program product of claim 8, wherein the computer readable program when executed on the computer causes the computer to also:
    identify a first user associated with the message;
    determine whether the group of one or more social users is associated with the first user; and
    rank the social activity data based at least in part on whether the group of one or more social users is associated with the first user.

11. The computer program product of claim 8, wherein the computer readable program when executed on the computer causes the computer to also rank the social activity data based at least in part on the one or more topics.

12. The computer program product of claim 8, wherein the computer readable program when executed on the computer causes the computer to also:
  identify a first user associated with the message and a group of one or more second users associated with the first user; and
  generate the graphical user interface data for providing an access to the group of one or more second users.

13. The computer program product of claim 8, wherein the computer readable program when executed on the computer causes the computer to also:
  generate one or more tags based at least in part on the one or more topics associated with the message; and
  generate the graphical user interface data for displaying the one or more tags.

14. The computer program product of claim 8, wherein the social activity data includes a post provided by a social network service.

15. A system comprising:
  a processor; and
  a memory storing instructions that, when executed, cause the system to:
    determine one or more topics associated with a message based at least in part on message data included in the message;
    determine knowledge data describing the one or more topics associated with the message;
    determine social activity data describing one or more user activities associated with a group of one or more social users based at least in part on the knowledge data, the one or more user activities describing the one or more topics;
    generate a selectable tag based at least in part on the social activity data describing the one or more user activities, a selection of the selectable tag causing a display of the social activity data associated with the message; and
    generate graphical user interface data for displaying the social activity data associated with the message in response to the selectable tag being selected.

16. The system of claim 15, wherein the instructions, when executed, cause the system to also rank the social activity data based at least in part on one or more popularities associated with the social activity data.

17. The system of claim 15, wherein the instructions, when executed, cause the system to also:
  identify a first user associated with the message;
  determine whether the group of one or more social users is associated with the first user; and
  rank the social activity data based at least in part on whether the group of one or more social users is associated with the first user.

18. The system of claim 15, wherein the instructions, when executed, cause the system to also rank the social activity data based at least in part on the one or more topics.

19. The system of claim 15, wherein the instructions, when executed, cause the system to also:
  identify a first user associated with the message and a group of one or more second users associated with the first user; and
  generate the graphical user interface data for providing an access to the group of one or more second users.

20. The system of claim 15, wherein the instructions, when executed, cause the system to also:
  generate one or more tags based at least in part on the one or more topics associated with the message; and
  generate the graphical user interface data for displaying the one or more tags.

* * * * *